Aug. 27, 1957    J. A. BOSTON    2,804,026
CROSS GRAIN DOUGH MOLDER
Filed April 2, 1953    2 Sheets-Sheet 1

INVENTOR.
JOHN A. BOSTON
BY Otto Moeller

Aug. 27, 1957    J. A. BOSTON    2,804,026
CROSS GRAIN DOUGH MOLDER

Filed April 2, 1953    2 Sheets-Sheet 2

INVENTOR.
JOHN A. BOSTON
BY
Otto Moeller

United States Patent Office 2,804,026
Patented Aug. 27, 1957

2,804,026

CROSS GRAIN DOUGH MOLDER

John A. Boston, York, Pa., assignor, by mesne assignments, to Capitol Products Corporation, Mechanicsburg, Pa., a corporation of Pennsylvania Application April 2, 1953, Serial No. 346,460

2 Claims. (Cl. 107—12)

My invention pertains to improvements in dough working machines, in which individual sheeted pieces of dough received from one or more sets of sheeting rolls, are subjected to a final molding operation in a direction normal to the travel of the dough pieces through the sheeting rolls, whereby the final molding operation is across the grain, which develops in the dough as a result of the initial sheeting of the dough pieces.

In such machines, it has been customary to provide an endless traveling belt arranged to receive the sheeted dough pieces from the sheeting rolls and transport the sheeted dough pieces therefrom in the same direction as the direction of travel of the dough through the sheeting rollers; and to provide a second endless traveling belt disposed at the delivery end of the first belt and disposed at right angles with respect thereto, whereby the dough sheet is projected from the first belt to the second belt and is then transported to the final molding means in a direction at right angles to its direction of travel through the sheeting rollers. The final molding means generally includes a chain-like mat cooperating with the second belt, for rolling up or coiling the dough sheet into the form of a scroll.

The primary object of the present invention is to provide improved, simple and practical transfer means for transferring the dough sheet from the first belt to the second belt that will accurately orient the dough sheet on the second belt to present the dough sheet to the final molding means in a direction at right angles to the direction of travel of the dough through the sheeting rollers.

Another object of the invention is to provide transfer means that is simply and conveniently adaptable to a machine of the above type for transferring dough sheets from the belt of a dough sheeting unit to the belt of a final molding unit extending and running in either direction at right angles to the first belt.

An additional object of the invention is to provide transfer means that is readily adjustable for dough pieces of different size, as for example, dough pieces for larger or smaller bread loaves.

The construction and operation of my improved cross grain dough molding means by which the above and other objects and advantages are attained, will be readily understood from the following description in which reference is made to the accompanying drawings.

Figure 1:
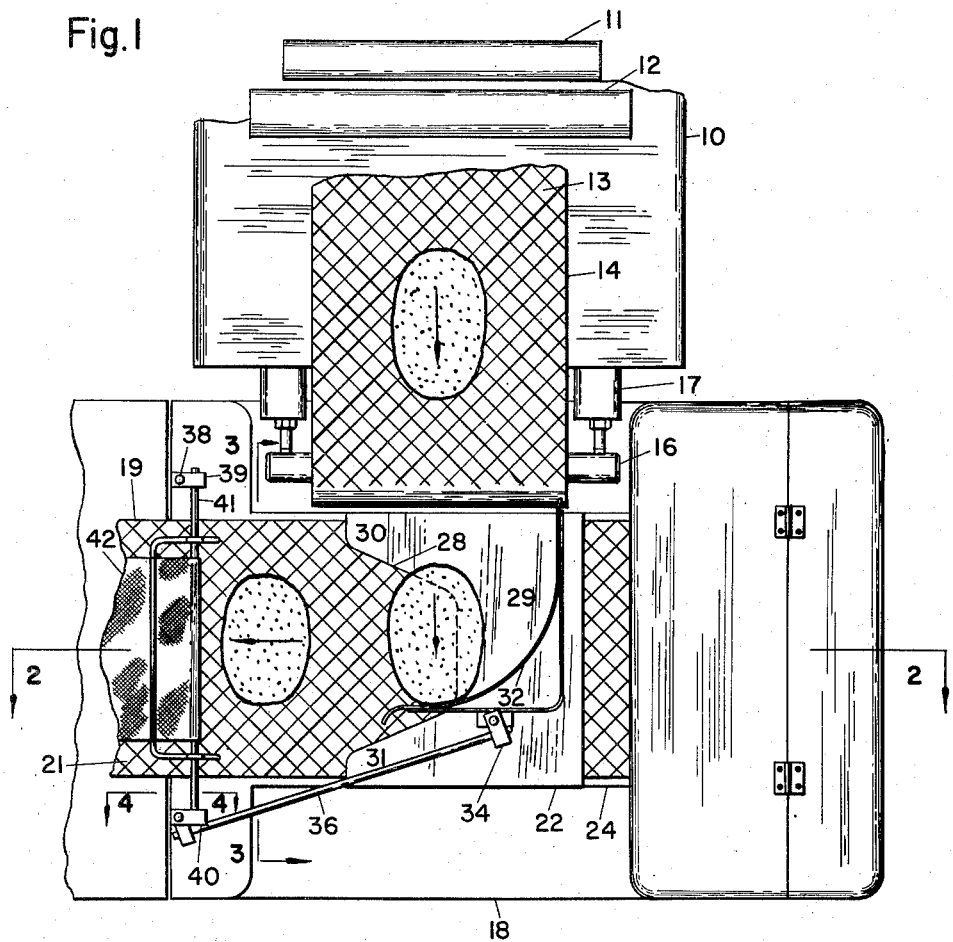
Figure 1 is a top plan of the adjacent ends of the dough sheeting and final molding units of a dough molder, only so much of these units being shown as is essential to an understanding of the invention.
Figure 5:
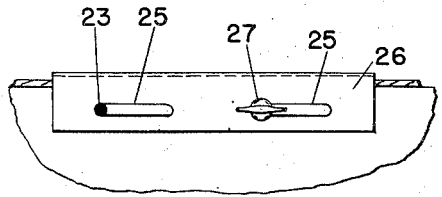
Figure 5 is a view in elevation taken on the line 5—5 of Figure 3.

Referring first to Figure 1, the numeral 10 designates a moulder dough sheeting unit, only so much of it being shown as is necessary to a full understanding of the invention. Such dough sheeting units are well known in the art and comprise one or more pairs of cooperating rolls through which lumps of dough, of the proper weight for producing bread loaves, are passed to sheet them into flat oval or elliptical pancake shape. One pair of such rolls is illustrated in Figure 1 and the individual rolls are numbered 11 and 12, respectively. Additional sets of rolls may and preferably are employed, as is customary in such devices, for sheeting the dough pieces.

From the sheeting rolls 11 and 12, the dough sheets are deposited or guided onto the upper run 13 of an endless belt conveyor 14, disposed below the sheeting rolls, and traveling in the direction indicated by the arrow. The belt conveyor 14 is mounted at its forward end on a roller 15, carried by the shaft 16, suitably journaled in a bearing support means, designated as a whole by the numeral 17, disposed at the forward end of the sheeting unit 10. The opposite end of the belt conveyor 14 is mounted on another roller, not shown, and may be driven in a manner conventional in the art. It will be noted that the sheeted dough pieces are conveyed to the forward end of the unit 10 in the same direction as the dough pieces pass through the sheeting rolls, in other words, they are conveyed in the direction of the grain, which develops in the dough sheet as a result of the sheeting operation.

From the belt conveyor 13, the sheeted dough pieces are projected onto the final moulder unit, designated as a whole by the numeral 18. On this unit 18, several operations may be successively performed on the dough sheets, the first of which is a coiling operation, whereby the dough sheets are rolled up or coiled into the form of a scroll. In what is commonly known as cross graining, the dough sheet is coiled in a direction transverse, preferably at 90°, to the direction of travel of the dough through the sheeting rolls 11, 12.

In order to accomplish this cross graining, the unit 18 is disposed at right angles to the unit 10, with its receiving or rearward end adjacent the delivery or forward end of thte unit 10. An endless conveyor 19 is mounted on and extends longitudinally of the unit 18, being trained around a roller 20 at the rearward or receiving end of unit 18 and another roller, not shown, at the forward or discharge end thereof. Suitable means, well known in the art and therefore not shown, is provided for driving the conveyor 19, so that the upper run 21, travels in the direction indicated by the arrow. The upper run 21 of conveyor 19, thus travels at right angles with respect to the direction of travel of the upper run 13 of conveyor 14.

The conveyors 14 and 19 are arranged so that the top surface of the upper run 21 of conveyor 19, is somewhat below the level of the top surface of the upper run 13 of conveyor 14, and the side of the rearward portion of the upper run 21 of conveyor 19, is closely adjacent the forward or discharge end of the conveyor 14.

A flat plate 22 is mounted over that portion of the upper run 21 of conveyor 19, opposite the delivery end of the conveyor 14, with just sufficient clearance between the plate 22 and conveyor run 21 to permit the conveyor to operate freely. The plate 22 is supported by pins 23, formed with the upright side wall portions 24 of the unit 18 and which pins extend laterally outward through horizontal slots 25 in tthe depending side flanges 26 of the plate 22. The horizontal slots 25 permit the plate 22 to be adjusted lengthwise of the conveyor 19, in any one of the number of positions with respect to the delivery end of conveyor 14, to accommodate various size dough sheets. One or more of the pins 23 are threaded to receive wing nuts 27, whereby the plate 22 may be secured in adjusted position.

The various parts are so arranged that when the plate 22 is in position, its top surface will be slightly below the top surface of the upper run 13 of the conveyor 14, so that dough sheets projected from the conveyor 14 move on and across the plate 22. The plate 22 is provided midway in its forward edge with a generally U-shaped indentation 28, preferably slightly tapered from a greater width at the outer end of the indentation to a slightly lesser width at the inner end of the indentation. The plate thus formed, has a transverse rearward portion 29 extending the full width of the conveyor 19 and similar wing portions 30 and 31 extending forwardly of transverse portion 29. The wing portion 31, in the device as shown in Figure 1, can be eliminated but for a purpose to be later explained, the plate 22 is preferably made symmetrical with similar wing portions 30 and 31.

The portion of the plate 22 adjacent the delivery end of conveyor 14, which includes the wing portion 30, should have a longitudinal extent to provide a support or guide for substantially the width of the dough sheets transported along and projected from the upper run 13 of the conveyor 14. The depth of the indentation in the plate 22 is such that the rearward half of the dough sheet, in respect of its position relative to the conveyor 19, or slightly less than half, will be supported on the plate portion 29.

An important purpose of the plate portion 29 is to maintain the dough sheet in a flat condition and prevent the dough sheet from folding upon itself on the conveyor 19. To illustrate, assume the plate portion 29 to be removed, it will be apparent that if the rearward portion of a dough sheet, considered relative to its position with respect to the conveyor 19, should contact the upper run 21 of the conveyor 19 before the forward portion of the dough sheet, then by reason of the movement of the conveyor 19, the rearward portion of the dough sheet would be advanced before the forward portion, tending to cause the dough sheet to buckle. The plate portion 29, insures that the forward portion of the dough sheet is the first to contact the conveyor 19.

The tapered form of the wing portion 30 of the plate 22 assists in effecting a progressive contact of the dough sheet with the conveyor 19, from front to rear of the dough sheet relative to its position on the conveyor 19, and further assists in preventing buckling of the dough sheet.

A curved stop plate 32 supported immediately above the plate 22, as hereinafter described, orients the dough sheets projected from the conveyor 14 on the conveyor 19 and plate 22. The stop plate 32 extends transversely along the rearward portion of plate 22 from a point adjacent the conveyor 14, and then curves forwardly and projects beyond the indented edge 28 of the plate 22. The curved form of the stop plate 32, assists in initiating the forward movement of the dough sheet providing a smooth, unhesitating movement to the dough sheet, as it changes direction of travel.

Adjustable means is provided for adjusting the stop plate 32 in any one of a number of positions longitudinally and laterally of the plate 22 and conveyor 19, for proper orientation of different size dough sheets. For this purpose, an upright standard 33, circular in cross section, is mounted on the unit 18 at one side of the conveyor 19 and forward of the plate 22. A clamping block 34 is mounted on the standard 33 and is arranged to be secured thereto in any one of a number of positions by a set screw 35, or other suitable locking means. A rod 36 extends at one end through the block 34 and at its opposite end is suitably connected with the stop plate 22. A lock screw 37, or other suitable means, secures the rod 36 in any one of a number of positions in the block 34.

Figure 2:
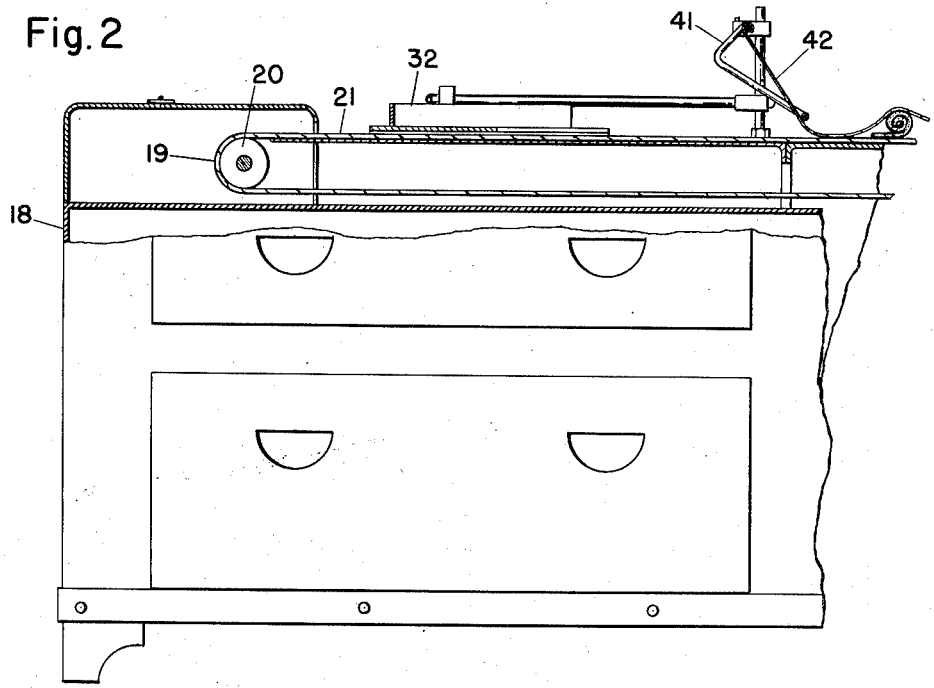
Figure 2 is a sectional view taken on the line 2—2 of Figure 1 with parts shown in elevation.
Figure 3:
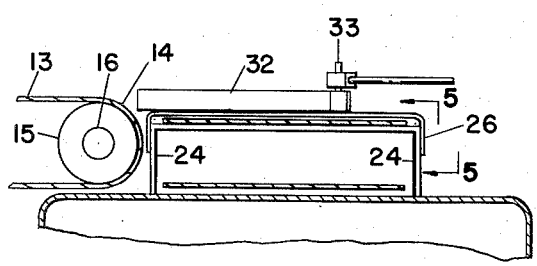
Figure 3 is a sectional view taken on the line 3—3 of Figure 1.
Figure 4:
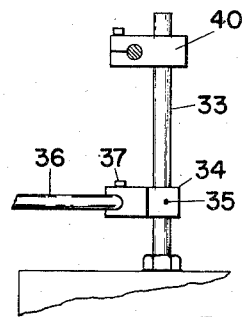
Figure 4 is an enlarged sectional view taken on the line 4—4 of Figure 1.

Also mounted on the standard 33 and a similar standard 38 on the opposite side of the conveyor 19 are clamp blocks 39 and 40, in which are clamped the opposite ends of a rod 41 extending transversely across and above the upper run 21 of the conveyor 19. One end of a metal chain mat 42 is attached to the rod 41, while the remaining portion is left free and will drag on the upper run 21 of conveyor 19 until contacted by a dough sheet transported by the conveyor 19. Contact of the dough sheet with them at 42 will cause the dough sheet to be rolled up in scroll form, as shown in Figure 2, in which rolled up shape it is then ready for any further molding operation prior to being deposited in a baking pan. The dough sheet, because of change in direction of travel from the conveyor 14 to the conveyor 19 will, it is clear, be rolled up in a direction about at right angles to the direction in which it was sheeted, and thus be rolled up across the grain that develops in the dough sheet in the sheeting operation.

As shown in Figure 1, the sheeted dough pieces are delivered from the unit 10 to the right side of the unit 18, however, since the plate 22 is symmetrical in shape, the unit 10 may be arranged to deliver sheeted dough pieces from the opposite side, by simply attaching the rod 36 to the standard 38 and turning the stop plate 32 over.

I claim:

1. In a dough molder, a first belt conveyor for transporting sheeted pieces of dough, a second belt conveyor extending transversely of said first belt conveyor and having one end portion thereof adjacent the delivery end of said first conveyor and having its top surface in a plane below the plane of the top surface of said first belt conveyor to receive sheeted pieces of dough projected therefrom, and transport them in a direction transverse with respect to the direction of travel of the sheeted pieces of dough along said first belt conveyor, a plate immediately over said second belt conveyor and below the plane of said first belt conveyor in the path of the sheeted pieces of dough projected from said first belt conveyor, said plate being recessed at its forward end to form forward and rearward plate portions, so that a portion of the projected sheeted pieces of dough contacts the second belt conveyor and is carried forwardly thereby, and a stop member supported immediately above said plate and extending from a point adjacent the delivery end of said first belt conveyor transversely along the rear of said rearward plate portion and curving forwardly therefrom in the path of the sheeted pieces of dough projected from said first belt conveyor for orienting said sheeted pieces of dough on said plate and second belt conveyor.

2. A dough moulder as defined in claim 1, including means for laterally and longitudinally adjusting the position of said stop member with respect to said plate.

References Cited in the file of this patent

UNITED STATES PATENTS

| | | |
|---|---|---|
| 1,669,220 | Thropp et al. | May 8, 1928 |
| 2,647,612 | Sticelber | Aug. 4, 1953 |